United States Patent
Jansson

(10) Patent No.: US 9,021,031 B1
(45) Date of Patent: Apr. 28, 2015

(54) PROVIDING FOR SELECTIVE AVAILABILITY ON A MESSAGING SERVICE

(75) Inventor: Anna Jansson, Dublin (IE)

(73) Assignee: Google Inc., Mountain View, CA (US)

( * ) Notice: Subject to any disclaimer, the term of this patent is extended or adjusted under 35 U.S.C. 154(b) by 40 days.

(21) Appl. No.: 13/315,203

(22) Filed: Dec. 8, 2011

(51) Int. Cl.
*G06F 15/16* (2006.01)
*H04L 29/06* (2006.01)

(52) U.S. Cl.
CPC .................................. *H04L 29/06* (2013.01)

(58) Field of Classification Search
CPC ... H04L 12/58; H04L 12/585; H04L 12/5855; H04L 12/588
USPC .......................................... 709/206, 227, 228
See application file for complete search history.

(56) References Cited

U.S. PATENT DOCUMENTS

| | | | |
|---|---|---|---|
| 7,533,153 B1 | 5/2009 | Wood et al. | |
| 2005/0114783 A1* | 5/2005 | Szeto | 715/747 |
| 2005/0223075 A1* | 10/2005 | Swearingen et al. | 709/207 |
| 2006/0004911 A1* | 1/2006 | Becker et al. | 709/207 |
| 2006/0015609 A1* | 1/2006 | Hagale et al. | 709/224 |
| 2007/0011230 A1* | 1/2007 | Clech et al. | 709/204 |
| 2007/0061405 A1* | 3/2007 | Keohane et al. | 709/207 |
| 2007/0286366 A1 | 12/2007 | Deboy et al. | |
| 2007/0288573 A1* | 12/2007 | Malik | 709/205 |
| 2008/0075066 A1* | 3/2008 | Baker | 370/352 |
| 2008/0086531 A1* | 4/2008 | Chavda et al. | 709/206 |
| 2009/0249432 A1* | 10/2009 | O'Sullivan et al. | 726/1 |
| 2011/0010447 A1 | 1/2011 | Fox et al. | |

* cited by examiner

*Primary Examiner* — Rupal Dharia
*Assistant Examiner* — Van Kim T Nguyen
(74) *Attorney, Agent, or Firm* — McDermott Will & Emery LLP

(57) ABSTRACT

A system and machine-implemented method for selectively setting the availability of a user with respect to one or more contacts within an messaging service, the method comprising receiving an indication of a user entering a selective availability mode while the user is logged into an messaging service, wherein the messaging service maintains a list of a plurality of contacts associated with the user and setting the availability status of the user to unavailable at the messaging service with respect to the plurality of contacts in response to the detection, such that the plurality of contacts are prohibited from communicating with the user through the messaging service, while the user remains logged into the messaging service.

19 Claims, 6 Drawing Sheets

PROVIDING FOR SELECTIVE AVAILABILITY ON A MESSAGING SERVICE

BACKGROUND

The subject disclosure generally relates to controlling availability of the user for communication, and, in particular, to providing for selective availability of a user.

Various messaging services provide means for users to set a status while online, indicating the availability of the user to engage in a conversation. The status may be set as available, busy, idle, or a customized status created by the user (e.g., working, in a meeting). Additionally, a user may choose to be invisible, where even though the user is online, the user will appear as offline to contacts on his/her contact list.

However, despite the selected status, the user may get messages from contacts when the user has indicated that he/she is busy, or even set as invisible. This is inconvenient where the user would like to communicate with a selected number of contacts on the messaging service.

Thus, it may be desirable to provide the user with a more effective way of controlling his or her availability to be contacted by contacts over a messaging service.

SUMMARY

The disclosed subject matter relates to a machine-implemented method for selectively setting the availability of a user with respect to one or more contacts within an messaging service, the method comprising receiving an indication of a user entering a selective availability mode while the user is logged into an messaging service, wherein the messaging service maintains a list of a plurality of contacts associated with the user and setting the availability status of the user to unavailable at the messaging service with respect to the plurality of contacts in response to the detection, such that the plurality of contacts are prohibited from communicating with the user through the messaging service, while the user remains logged into the messaging service.

The disclosed subject matter also relates to a system for selectively setting the availability of a user with respect to one or more contacts within an messaging service, the system comprising one or more processors and a machine-readable medium comprising instructions stored therein, which when executed by the processors, cause the processors to perform operations comprising receiving a request to an instant messaging mode of a user to a selective availability mode while the user is logged into an messaging service, wherein the messaging service maintains a list of a plurality of contacts associated with the user. The operations further comprising setting the availability status of the user to unavailable at the messaging service with respect to the plurality of contacts in response to the request, such that the plurality of contacts are prohibited from communicating with the user through the messaging service while the user remains logged into the messaging service. The operations further comprising receiving a request to allow communication with one or more contacts of the plurality of contacts while the user is within the selective availability mode and modifying the availability status of the user at the messaging service to available with respect to the one or more contacts in response to receiving the request to allow communication, such that the one or more contacts are able to communicate with the user through the messaging service.

The disclosed subject matter also relates to a machine-readable medium comprising instructions stored therein, which when executed by a machine, cause the machine to perform operations comprising setting the availability status of a user to unavailable at the messaging service with respect to the plurality of contacts associated with the user in response to detecting that an instant messaging mode of the user is set to the selective availability mode such the plurality of contacts are prohibited from communicating with the user through the messaging service although the user is logged into the system, wherein the messaging service maintains a list of the plurality of contacts associated with the user. The operations further comprising receiving a request to allow communication with one or more contacts while the user is in the selective availability mode and modifying the availability status of the user at the messaging service to available with respect to one or more contacts to enable the one or more contacts to communicate with the user through the messaging service in response to receiving the request, while still prohibiting the plurality of contacts other than the one or more contacts from communicating with the user through the messaging service.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
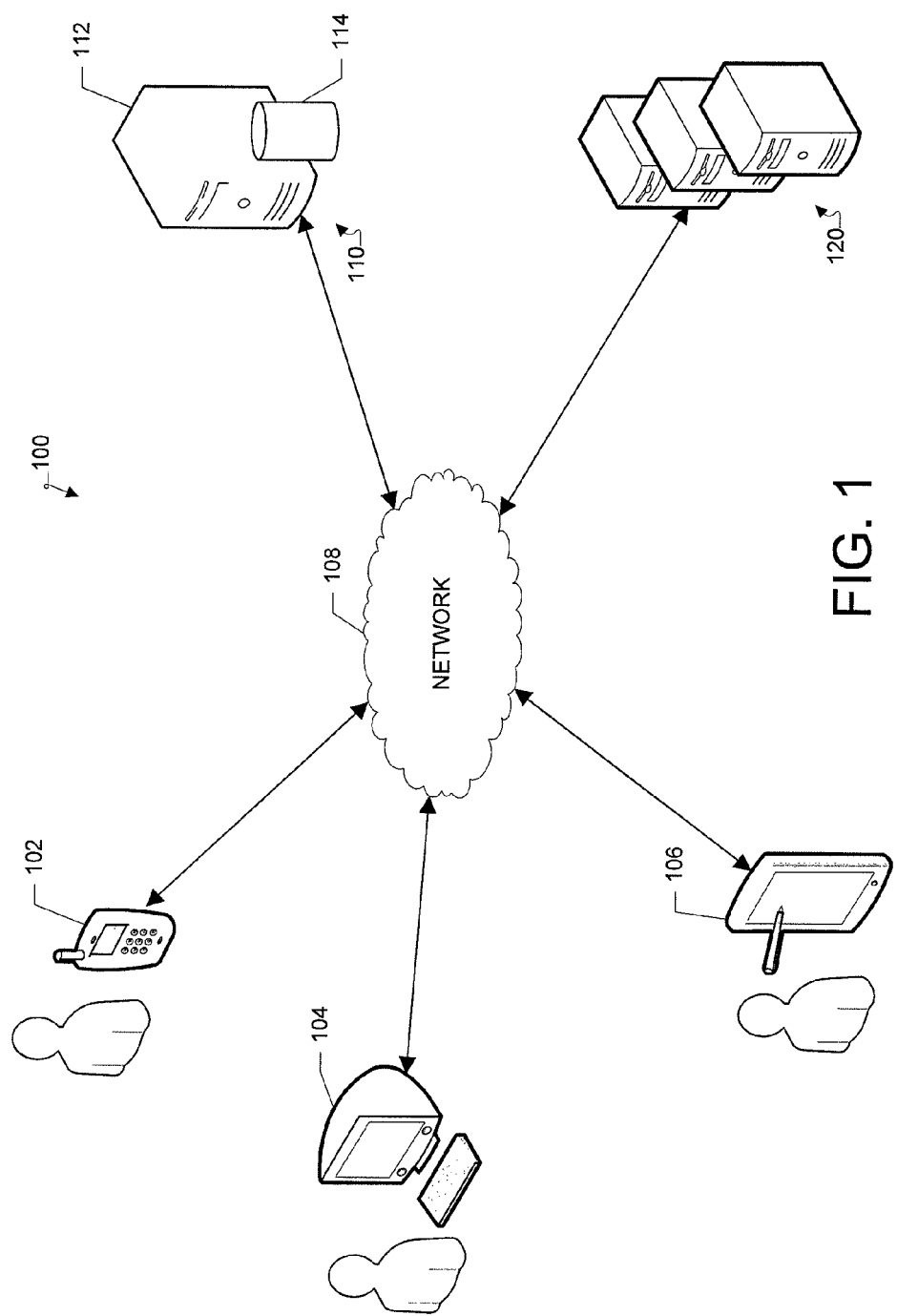
FIG. 1 illustrates an example client-server network environment which provides for selective availability to communicate with user through a messaging service.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter provides a system and method for providing the user with an option for selective availability on a messaging service such as a chat, or instant messaging service. In addition to the normal mode (e.g., the existing mode on the messaging service providing the user with the existing status options), the system provides an additional selective availability mode. If the user chooses the selective availability mode, the default status (e.g., chat status, messaging status) of the user for all contacts of the user may be set to unavailable, such that the user appears offline to all his/her contacts and the contacts are prohibited from contacting the user (unlike where the status of the user is set to invisible). While in the selective availability mode, the user may then select one or more specific contacts and select to be available for with those contacts, at which point the contact will be able to send messages to the user through the messaging service.

Instead of having to manually block and unblock users one by one when the user is not interested in being contacted by a group of his contacts, the user is able to easily switch to the selective unavailability mode. The selective availability mode provides a way to prohibit communication from all users while the user is logged into the messaging service unless the user chooses a specific user or group of users and selects to allow communication with those users. Thus, the user is able to manage his/her availability easily, such that in a single step the user is made unavailable to all his/her contacts and later can select to be available to individual users. Accordingly, the disclosed subject matter provides an efficient method of propagating a change of availability to all contacts of the user instead of the user having to block each contact separately. This is helpful, since the number of contacts within a user contact list may be large and blocking each user individually may be a long and tedious task. Furthermore, unlike blocking where the user appears available to all users until each undesired user is individually blocked, the user is able to first select to become unavailable to all his/her contacts, and then may selectively choose specific contacts and allow communication with those users. Furthermore, once the user has decided to return to normal mode, the user may become available to all his/her contacts, whereas in the case of blocking the user would have to unblock each user separately.

Additionally, the user may select a specific status for each contact. The same statuses available in normal mode may be available to the user in the selected availability mode. Thus, the user may choose between available, busy, idle or a customized status message, or may optionally set an invisible status at which point the user will appear unavailable (but will still receive messages from the contact).

Every time the user logs into the system, the user is logged in with a default mode and status. In one example, the default mode may always be set to the normal mode. In another example, the default mode may be the last mode selected by the user during the last instant messaging session. If the default mode is set as selective availability mode, the user will appear offline to all contacts on his/her list and the contacts will be prohibited from contacting the user (e.g., any messages sent to the user will not be delivered). The user may then select one or more contacts, and for each contact, the user may individually select to be available for with the contact and may further select a specific status.

In addition, the user may set up one or more profiles (e.g., work, friends, project A). Contacts may be labeled with an identifier of the profile such that each profile may be associated with one or more individual contacts. When the user selects the selective availability mode and selects a profile, the system may then automatically change the status of the user for the contacts associated with the profile, such that all contacts associated with the profile are able to contact the user through the messaging service. The system may further determine whether a specific status should be displayed to each contact associated with the profile.

While in the selective availability mode, at any time during the instant messaging session, the user is able to select a new contact that he/she wishes to with and may choose to allow communication with the new contact and may further select a status for the new contact. Similarly, the user may select any of the contacts that the user is currently available to and may select to remove the contact, so that the user will appear offline to that contact and the contact will be prohibited from sending the user messaging through the messaging service.

Various embodiments of the subject disclosure may be described herein in reference to an instant messaging service for exemplary purposes. It should be understood by one of ordinary skill in the art that the system and processes described throughout the subject disclosure may be applicable to various messaging services.

The phrase "messaging service" as used herein may refer to any service allowing for communication between two or more people (e.g., a user and his/her contacts) using personal computers or other electronic devices using messages. The phrase "instant messaging service" as used herein may refer to a form of real-time direct text-based chatting communication in push mode between two or more people (e.g., a user and his/her contacts) using personal computers or other electronic devices, along with shared clients. The user's text is conveyed over a network, such as the Internet. More advanced instant messaging software clients also allow enhanced modes of communication, such as live voice or video calling and inclusion of links to media. The term "chat" and "chatting" as used herein may refer to any kind of communication over the Internet that offers an instantaneous transmission of text-based (or other multi-media content) messages from a sender to a receiver and may include point-to-point communications as well as multicast communications from one sender to many receivers.

As used herein the term "availability status" refers to a status maintained by the system which controls whether the user is available to with a contact while in the selective availability mode. In one example, the availability status of the user may be set to available, indicating that the user is available to with a contact, and unavailable, indicating that the user in unavailable to with a contact. The term "status" refers to an indicator reflecting the user's availability to with his/her contacts (e.g., whether instant messages sent from the contact will be delivered to the user). The status may for example be set to available, indicating that the user is online and available to chat, idle, indicating that the user is away from their client device, busy, indicating that the user is busy and would not want to be interrupted, and invisible, which would cause the user to appear offline to his/her contacts when the user is actually available to (e.g., signed in and in normal mode, or for selected contacts in selective availability mode). The status may also be set to a personalized message or may include a personalized message. As used herein, "contacts" refer to other users that a user is associated with, at one or more messaging services.

FIG. 1 illustrates an example client-server network environment which provides for selective availability to communicate with user through a messaging service. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in reducing load time for displaying a webpage or web application at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108. In one example server 110 may host a messaging service and/or the system of the subject disclosure. In one example, the system may be embedded into the messaging service client application, while in another embodiment, the system may be used with a separate application providing services using one or more messaging services (e.g., hosted at one or more remote sites communicationally coupled to server 110).

A user interacting with a client device (e.g., electronic devices 102, 104 and 106) may access an instant messaging client application and may select to log into the service. Once the user is logged into the messaging service the user may automatically enter a selective availability mode or may select the selective availability mode using a menu or other selection mechanism. Once within the selective availability mode, the user may then select one or more contacts and select to become visible to those contacts. The user may then carry on conversation with those contacts (e.g., interacting with electronic devices 102, 104 or 106) through the service (e.g., hosted at server 110 or a remote server) while being unavailable to other contacts. The client devices (e.g., electronic devices 102, 104 and 106), the messaging service and/or the present system (e.g., hosted at server 110 and/or one or more remote servers) may be communicationally coupled through one or more networks (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
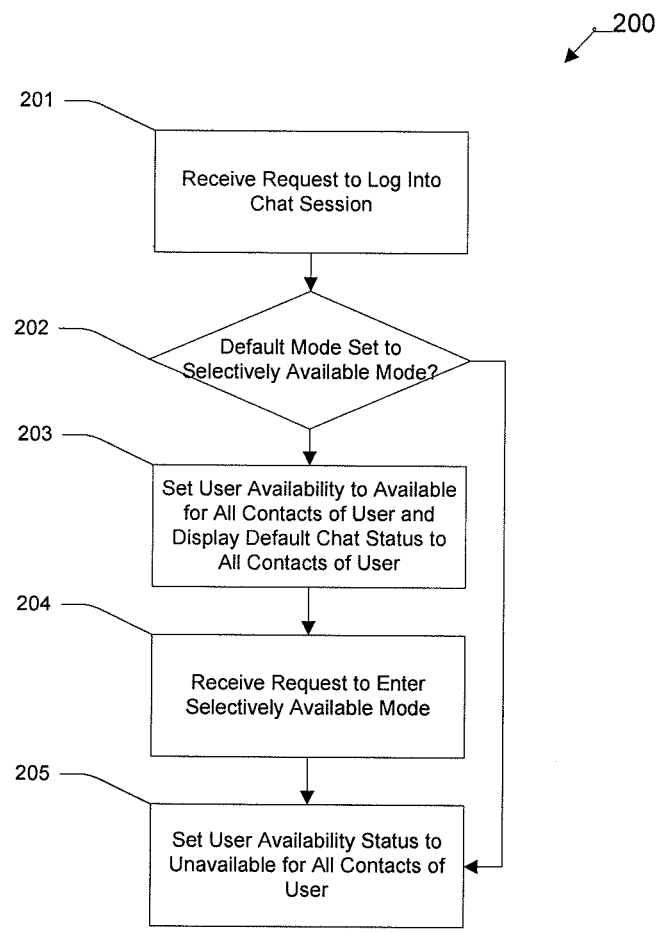
FIG. 2 illustrates a flow chart of an example process for providing a user of a messaging service with the ability to selectively communicate with selected contacts.

FIG. 2 illustrates a flow chart of an example process 200 for providing a user of a messaging service with the ability to selectively communicate with selected contacts. The process begins in step 201, where the system receives a request from a user to log into a session. In one example, the user may for example enter the address of the browser-based web instant messaging application or launch other software-based instant messaging application at the user's client device (e.g., electronic devices 102, 104 or 106) and may enter a username and/or password. Upon receiving the user request, the system may authenticate the user using the username and password and upon authentication may identify the user account associated with the user, and begin establishing a session associated with the user account.

Next, in step 202, the system determines whether the default mode for the user's session is set to the selective availability mode. For example, the default mode may be set according to a user setting (e.g., associated with the user profile), a system or developer setting, or may be set as the last mode that the user was in before logging out of the system. In one example, the user may always enter a session in normal mode. If, in step 201, it is determined that the default mode is not set to selective availability mode, the system continues to step 203.

In step 203, the system sets the user's availability status to available for all contacts of the user and displays the default status of the user to all contacts of user. In one example, the default status may be the last status of the user in normal mode or before the user logged out of the system. In another embodiment, the default status may be the same each time the user logs into the system. The status may be the same for all contacts or may be different (i.e., selectable) for each individual contact of the user. In one example, the system identifies the list of contacts associated with the user (e.g., associated with the user's account) and begins the session, allowing the one or more users to view the status of the user within their window and further able to establish a conversation with the user.

Next, in step 204, the system may receive a request to enter the selective availability mode. For example, the request may be received from the user through a selection on a menu or other similar selection means. For example, the selective availability mode may be provided within the same drop down menu displaying other statuses available to the user and the user may select the selectively available mode from the menu. In another example, the selectively available mode may be displayed as a separate button or menu entry on the window or the tool bar of an application or browser displaying the session. Upon receiving the request the process continues to step 205. Similarly, if in step 202, it is determined that the default mode is set to selective availability mode, the process continues to step 205.

In step 205, the system sets the user's availability status to unavailable for all contacts of the user. When the user's availability status is set to unavailable, the user will appear offline to all contacts. Furthermore, and in contrast to the invisible status, the user's contacts will not be able to begin a conversation with the user while the user's status is set to unavailable with respect to the contacts. Once the user is in the selective availability mode, the user may select one or more contacts and may change his/her availability specifically with respect to the selected contacts while remaining unavailable to all his/her other contacts. The selection of contacts may include the selection of specific contacts or a profile associated with the contacts. Similarly, the system may automatically allow communication with one or more contacts upon receiving indication that the user is engaged in a specific task (e.g., by automatically detecting the task, or receiving an input from the user indicating that the user is engaging in the task). The process of selectively allowing communication with selected contacts is described in further detail below with respect to FIG. 3. Once within the selective availability mode, the user will appear offline to all his/her contacts other than the selected contacts, until the user logs out of the system or the returns to normal mode.

Figure 3:
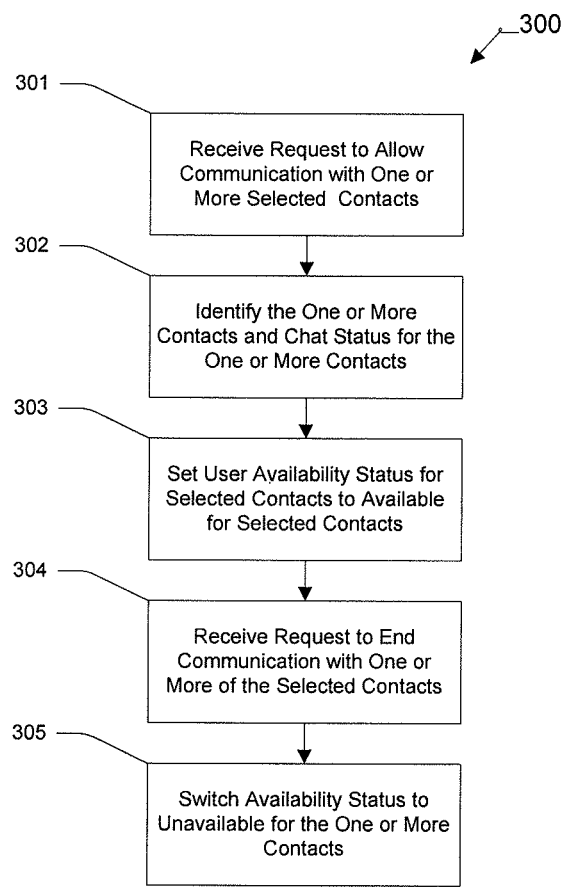
FIG. 3 illustrates an example process for selectively allowing communication with selected contacts while the user is in the selective availability mode.

FIG. 3 illustrates an example process 300 for selectively allowing communication with selected contacts while the user is in the selective availability mode. In step 301, the system receives a request to allow communication with one or more selected contacts. In one example, the request may be a user request or may be triggered by the system.

The user may for example select a specific contact form his/her contact list and select to allow chatting with the selected contact. The user may further select a status to be displayed to the selected contact. Similarly, the user may have one or more contacts which are associated with a profile and may select the profile for allowing chatting with all of the contacts associated with the profile. For example, the system may allow the user to label one or more of his/her contacts with specific labels, and the labels may include one or more profiles (e.g., work people, family, etc.). Upon selecting the availability mode, the system may identify all labels associated with one or more contacts of the user and may provide a listing of the labels for display and selection.

Additionally, the request received in step 301 may be triggered by the system. For example, the system may detect a task being performed by the user and may trigger selective communication with one or more contacts associated with the task. The one or more contacts may be associated with the task (e.g., by the user, or task creator or organizer) sometime prior to the task being performed by the user. For example, the task may be a meeting or other similar task saved in a calendar, and the meeting organizer may indicate one or more users which are associated with the task as part of the calendar entry. In another example, the user may label certain contacts with common tasks that are associated with those contacts, and upon detecting the task, the system may identify all contacts associated with the task. The association between one or more contacts and a task (e.g., labels) may be assigned by the system based on historical information (e.g., contacts selected in previous instances where the user engaged in the task). The system may detect a task being performed by the user upon receiving an indication from the user (e.g., a message, a menu selection), or may automatically detect the task based on context information regarding the task (e.g., time and date of meeting) or other characteristics indicating that the user is beginning to perform the task.

In step 302, the system identifies the selected contacts and may further identify a status associated with one or more of the selected contacts. As described above, selectively allowing for communications with one or more contacts while the user is in the selective availability mode may be triggered based on a user request and/or upon detection of a task performed by the user and associated with one or more contacts. The process of identifying selected contacts based on a user selection is described in further detail below with respect to FIG. 4. The process of identifying selected contacts in response to a user performing a task is described in further detail below with respect to FIG. 5.

Upon identifying the selected contacts and a status associated with the selected contacts, the process continues to step 303. In step 303, the system sets the user's availability status to available with respect to the selected contacts. Once the user's availability status is set to available, the selected contacts may begin a conversation with the user through the service. During step 303 the system may further display the identified status associated with each contact to the contact (e.g., within the list of the contact next to the user's name).

While within the selective availability mode, the user may decide to modify the contacts allowed to engage in communication with the user. The user may add any additional contacts while in the selective availability mode, and the system will perform the same or similar steps as steps 301-303 each time the user request to add to the selected contacts that are allowed to communicate with the user through the messaging service while the user is in the selective availability mode. Additionally, a system detection of a task may also trigger allowing additional contacts to communicate with the user. Similarly, the system may remove the allowance of one or more contacts to with the user while the user is in the selective availability mode, such that the contacts are no longer able to with the contact (e.g., the user's availability status is modified to unavailable with respect to those users). The removal of the one or more of the selected contacts may occur in response to a user selection of the one or more contacts (or a profile) or in response to the indication that a task that triggered allowing communication with contacts associated with the task has terminated. For example, in step 304, the system may receive a request to end communication with the one or more of the selected contacts while the user is in the selective availability mode. In step 305, the system modifies the availability status of the user to unavailable for the one or more contacts.

Figure 4:
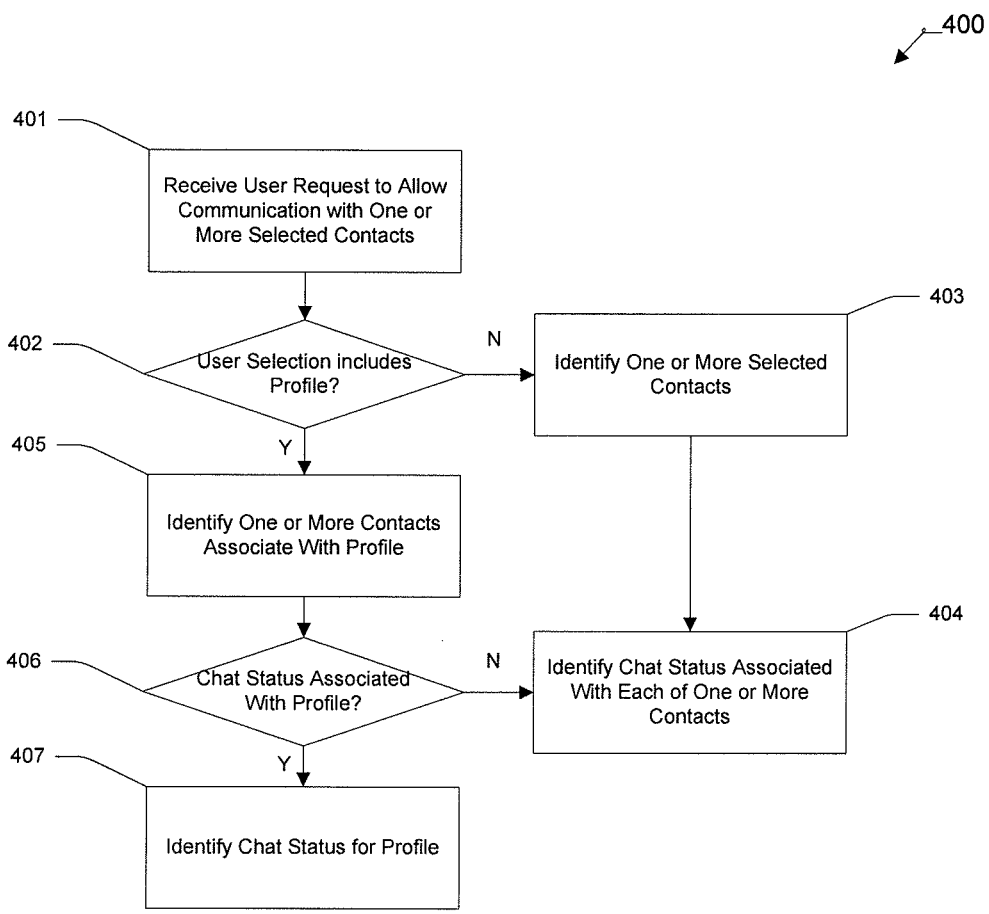
FIG. 4 illustrates a flow chart of an example process for identifying selected contacts for allowing communication based on a user selection or request.
Figure 5:
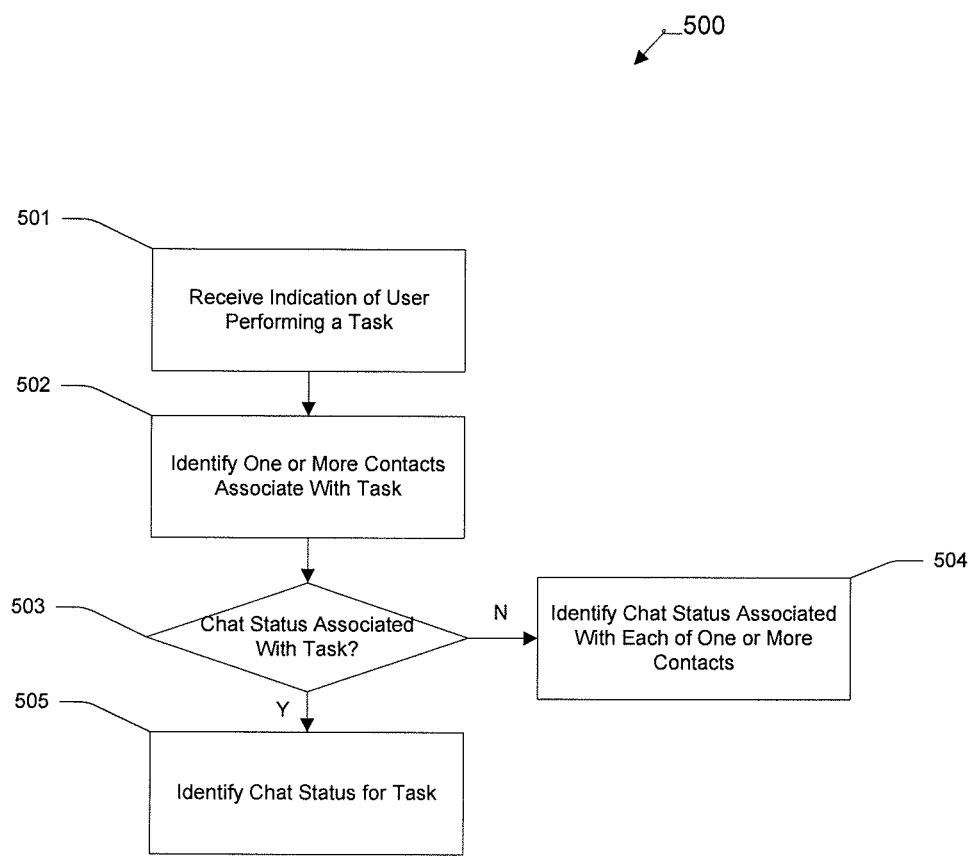
FIG. 5 illustrates a flow chart of an example process for identifying selected contacts for allowing communication in response to detecting a task being performed by a user.

FIG. 4 illustrates a flow chart of an example process 400 for identifying selected contacts for allowing communication based on a user selection or request. In step 401, the system receives a request to allow communication within one or more selected contacts. As described above, the user selection may be a selection of one or more contacts individually, or may include a selection of a profile associated with one or more contacts. In step 402, the system determines if the user selection includes a profile selection. If, in step 402, the system determines that the selection is not a profile selection, i.e., the user selected one or more individual contacts, the process continues to step 403, and identifies the one or more individual contacts. Next, in step 404, the system identifies the status associated with each of the one or more contacts identified in step 403. In one example, the user, upon selecting an individual contact may also select a status to be displayed to the selected contact, and the system will identify the status according to the user selection. Alternatively (e.g., in the absence of an explicit selection by the user), the system may determine a default status for the one or more identified contacts (e.g., if the user does not make a selection). The default status may for example be the last status used in association with each contact (e.g., during last session in selective availability mode or at anytime during a session).

On the other hand, if in step 402, it is determined that the user selected a profile, then the process continues to step 405. In step 405, the system identifies one or more contacts associated with the profile (e.g., based on a list associated with the profile, or labels associated with each contact). Next, in step 406, the system determines if a specific status is associated with the selected profile. For example, at the time of selection, the user may select a status for the profile. Additionally, the profile may be pre-associated with a status, or the system may select a default status based on the last status used with respect to the profile (e.g., during last session in selective availability mode or at anytime during a session). If, in step 406, the system determines that a status is associated with the profile the system identifies the status for the profile in step 407. If a profile status exists, the status may be applied to all contacts identified in step 405 (unless otherwise requested by the user).

If, on the other hand, the system determines that the profile is not associated with the status, the system continues to step 404 and identifies a status for the one or more contacts, as described above FIG. 5 illustrates a flow chart of an example process 500 for identifying selected contacts for allowing communication in response to detecting a task being performed by a user. In step 501, the system receives an indication of a user performing a task. The indication may be received in response to the user selection of menu item or otherwise requesting allowing selective communication in association with a task, or may be triggered by the system in response to receiving an indication (or detecting) that the user is beginning to or is in the process of performing a task. In step 502, the system identifies the one or more individual contacts associated with the task (e.g., based on a list including the contacts associated with the task, or labels associated with each contact).

Next, in step 503, the system determines if a specific status is associated with the task. For example, at the time of selection, the user may select a status for the task. Additionally, there task may be pre-associated with a status, or the system may select a default status based on the last status used with respect to the task or a similar task (e.g., during last session in selective availability mode or at anytime during a session). If, in step 503, the system determines that a status is associated with the task, the system identifies the task status in step 505. The task status may then be associated with all contacts identified in step 502 (unless otherwise requested by the user).

Otherwise, in step 504, the system identifies the status associated with each of the one or more contacts identified in step 502. In one example, the user may select a status for one or more individual contact associated with the task, and the system will identify the status according to the user selection. Furthermore, the system may determine a default status for one or more identified contacts (e.g., if the user does not make a selection). The default status may for example be the last status used with association with contact (e.g., during last session in selective availability mode or at anytime during a session).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
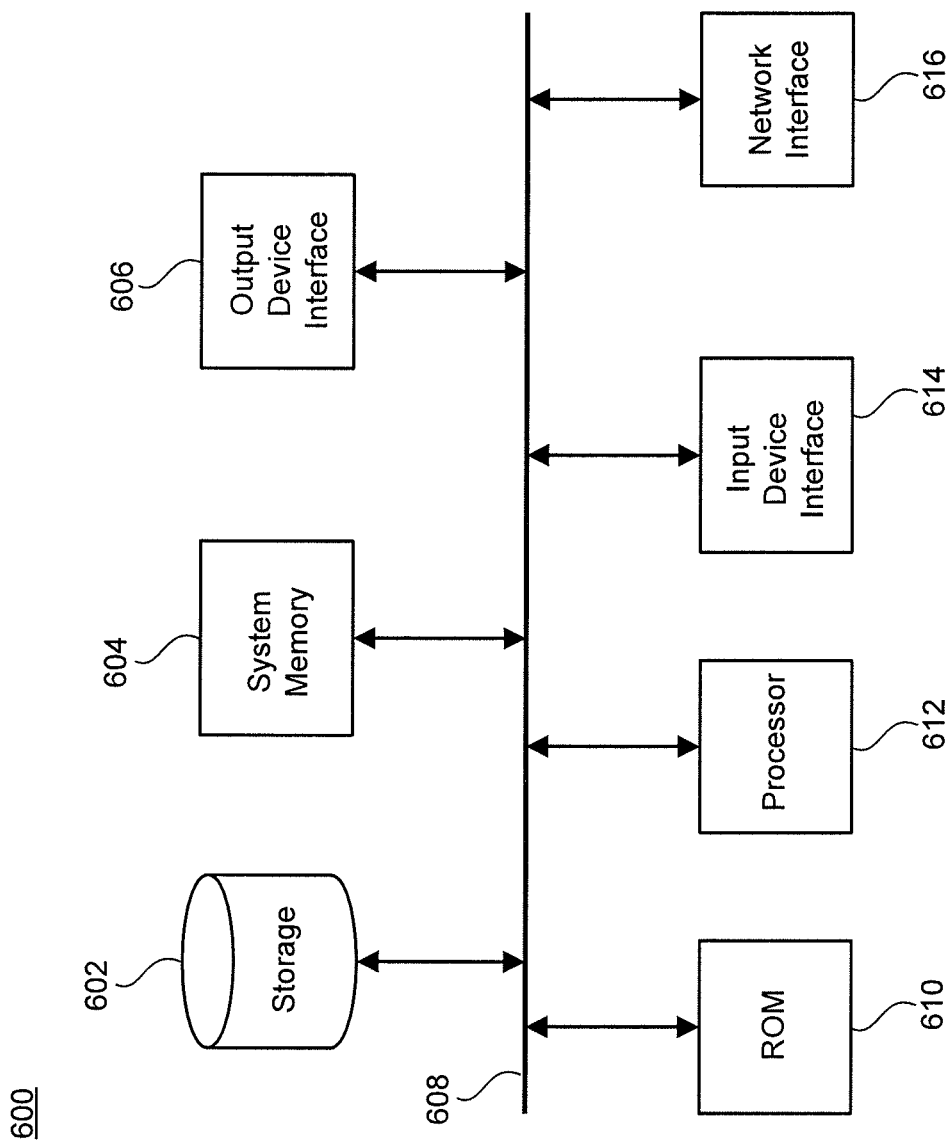
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for rendering DOM tree components according to various embodiments. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for selectively setting an availability of a user with respect to one or more contacts within a messaging service, the method comprising:
    identifying a user being logged into a messaging service and providing a set of two or more statuses selectable by the user while the user is logged into the messaging service, wherein each status of the set of two or more statuses is associated with a unique visual indication, wherein the messaging service maintains a list of a plurality of contacts associated with the user, the messaging service providing a normal mode and a selective availability mode, wherein while the user is in the normal mode, an availability status of the user is in a first status of the set of two or more statuses selectable by the user with respect to all of the plurality of contacts while the user is logged into the messaging service, and wherein while the user is in the selective availability mode, the availability status of the user is individually selectable from the set of two or more statuses with respect to each individual contact of the plurality of contacts,
    wherein the two or more statuses include at least an available status and an unavailable status, and wherein while the availability status of the user is in the available status with respect to a contact, the contact is displayed a first visual indication indicating to the contact that the user is logged onto the service and available for communication and the contact is able to communicate with the user, and while the availability status of the user is in the unavailable status with respect to a contact, the user is treated as being logged out of the messaging service with respect to the contact, such that the contact is provided with a second visual indication with respect to the user, the second visual indication indicating that the user is logged out of the service and not available for communication and the contact is not able to initiate communication with the user and is prohibited from communicating with the user through the messaging service, while the user remains logged into the messaging service;
    receiving an indication of the user entering the selective availability mode while the user is logged into the messaging service; and
    setting the availability status of the user at the messaging service to a selected status of the set of two or more statuses with respect to each of the plurality of contacts in response to receiving the indication, wherein the availability status of the user with respect to at least one contact of the plurality of contacts is set to the unavailable status and the availability status of the user with respect to at least another contact of the plurality of contacts is set to another status of the two or more statuses, wherein setting the availability status of the user with respect to a contact comprises displaying the unique visual indication associated with the availability status to the contact.

2. The method of claim 1, further comprising:
    receiving a request to allow communication with at least one contact of the plurality of contacts while the user is within the selective availability mode; and
    modifying the availability status of the user at the messaging service to the available status with respect to the at least one contact in response to receiving the request.

3. The method of claim 2, wherein one or more of the plurality of contacts other than the at least one contact are prohibited from communicating with user through the messaging service while the at least one contact is able to communicate with the user.

4. The method of claim 2, wherein the request is received in response to the user individually selecting the at least one contact.

5. The method of claim 2, wherein the request is received in response to the user selecting a profile associated with the at least one contact and the method further comprising identifying the at least one contact associated with the selected profile.

6. The method of claim 2, further comprising:
    identifying the availability status of the user with respect to each of the plurality of contacts, and displaying the availability status to each of the plurality of contacts.

7. The method of claim 2, wherein the request is received in response to receiving indication of the user performing a task.

8. The method of claim 7, wherein the at least one contact is associated with the task.

9. The method of claim 2, further comprising:
    receiving a request to terminate allowing communication with the at least one contact while the user is within the selective availability mode; and
    setting the availability status of the user to unavailable status with respect to the at least one contact in response to receiving the request to terminate, such that the at least one contact is prohibited from communicating with user through the messaging service while the user is within the selective availability mode.

10. The method of claim 9, wherein the request is a user request received in response to an indication of a user selection.

11. The method of claim 9, wherein the request is triggered in response to detecting that a task has terminated.

12. The method of claim 1, further comprising:
    receiving a request to allow communication with a group, wherein the group comprises one or more contacts of the plurality of contacts;

identifying the one or more contacts of the plurality of contacts; and for each of the one or more contacts, determining if the availability status of the user with respect to the contact is set to the unavailable status, and modifying the availability status of the user at the messaging service to the available status with respect to the contact, if it is determined that the availability status of the user with respect to the contact is set to the unavailable status, in response to receiving the request to allow communication with the group.

13. The method of claim 1, wherein while the availability status of the user is set to unavailable status, the user appears offline to the plurality of contacts.

14. The method of claim 1, further comprising:

receiving a request to exit the selective availability mode while the user is logged into the messaging service; and entering normal mode and setting the availability status of the user to the available status at the messaging service with respect to the plurality of contacts, such that the plurality of contacts are able to communicate with user through the messaging service while the user is logged into the messaging service.

15. A system for selectively setting an availability of a user with respect to one or more contacts within a messaging service, the system-comprising:

one or more hardware processors; and a machine-readable medium comprising instructions stored therein, which when executed by the processors, cause the processors to perform operations comprising:

receiving a request to set an instant messaging mode of a user to a selective availability mode while the user is logged into a messaging service providing a set of two or more statuses selectable by the user while the user is logged into the messaging service, wherein each status of the set of two or more statuses is associated with a unique visual indication, wherein the messaging service maintains a list of a plurality of contacts associated with the user, and wherein while the user is within the selective availability mode, an availability status of the user with respect to each of the plurality of contacts is one of a first status of the set of two or more statuses selectable by the user including an unavailable status or available status, wherein the available status and the unavailable status are distinct from each other;

setting the availability status of the user to the unavailable status at the messaging service with respect to the plurality of contacts in response to the request, such that the user is treated as being logged out of the messaging service with respect to the plurality of contacts, wherein the plurality of contacts are provided with a first visual indication with respect to the user, the first visual indication indicating that the user is logged out of the service and not available for communication and the plurality of contacts are not able to initiate communication with the user and are prohibited from communicating with the user through the messaging service while the user remains logged into the messaging service;

receiving a request to allow communication with one or more contacts of the plurality of contacts while the user is within the selective availability mode; and changing the availability status of the user at the messaging service to the available status with respect to the one or more contacts in response to receiving the request to allow communication, such that the one or more contacts are provided with a second visual indication indicating to the contact that the user is logged onto the service and available for communication and the one or more contacts are able to communicate with the user through the messaging service.

16. The system of claim 15, wherein the plurality of contacts other than the one or more contacts are still prohibited from communicating with user through the messaging service while the one or more contacts are able to communication with the user.

17. The system of claim 15, the operations further comprising:

receiving a request to terminate allowing communication with at least one of the one or more contacts while the user is within the selective availability mode; and setting the availability status of the user to the unavailable status with respect to the at least one of the one or more contacts in response to receiving the request to terminate, such that the at least one of the one or more contacts is prohibited from communicating with user through the messaging service while the user is within the selective availability mode.

18. A non-transitory machine-readable medium comprising instructions stored therein, which when executed by a machine, cause the machine to perform operations comprising:

identifying a user being logged into a messaging service providing a set of two or more statuses selectable by the user while the user is logged into the messaging service, wherein each status of the set of two or more statuses is associated with a unique visual indication, wherein the messaging service maintains a list of a plurality of contacts associated with the user, the messaging service providing a normal mode and a selective availability mode, wherein while the user is in the normal mode, an availability status of the user is in a first status of the set of two or more statuses selectable by the user with respect to all of the plurality of contacts and wherein while the user is in the selective availability mode, the availability status of the user is individually selectable from the set of two or more statuses with respect to each individual contact of the plurality of contacts, wherein the two or more statuses include at least an available status and an unavailable status, and wherein while the availability status of the user is in the available status with respect to a contact, the contact is provided with a first visual indication indicating to the contact that the user is logged onto the service and available for communication and the contact is able to communicate with the user and while the availability status of the user is in the unavailable status with respect to a contact, the user is treated as being logged out of the messaging service with respect to the contact, such that the contact is provided with a second visual indication with respect to the user, the second visual indication indicating that the user is logged out of the service and not available for communication and the contact is not able to initiate communication with the user and is prohibited from communicating with the user through the messaging service, while the user remains logged into the messaging service;

setting the availability status of the user to the unavailable status at the messaging service with respect to one or more contacts of the plurality of contacts associated with the user in response to detecting that an instant messaging mode of the user is set to the selective availability mode;

receiving a request to allow communication with at least one of the one or more contacts while the user is in the selective availability mode; and modifying the availability status of the user at the messaging service from the unavailable status to the available status with respect to the at least one of the one or more contacts to enable the at least one of the one or more contacts to communicate with the user through the messaging service in response to receiving the request.

19. The non-transitory machine-readable medium of claim 18, the operations further comprising:

receiving a request to terminate allowing communication with the at least one of the one or more contacts while the user is within the selective availability mode; and setting the availability status of the user to the unavailable status with respect to the at least one of the one or more contacts in response to receiving the request to terminate.

\* \* \* \* \*